(12) United States Patent
Chen (10) Patent No.: US 11,572,914 B2
(45) Date of Patent: Feb. 7, 2023

(54) SCREW HAVING A HEAD WITH DIFFERENT SOCKETS

(71) Applicant: ESSENCE METHOD REFINE CO., LTD., Tainan (TW)

(72) Inventor: Ling-Fang Chen, Tainan (TW)

(73) Assignee: Essence Method Refine Co., Ltd., Tainan (TW)

( * ) Notice: Subject to any disclaimer, the term of this patent is extended or adjusted under 35 U.S.C. 154(b) by 317 days.

(21) Appl. No.: 16/802,956

(22) Filed: Feb. 27, 2020

(65) Prior Publication Data
US 2021/0270304 A1 Sep. 2, 2021

(51) Int. Cl.
*F16B 23/00* (2006.01)

(52) U.S. Cl.
CPC ........ *F16B 23/003* (2013.01); *F16B 23/0023* (2013.01); *F16B 23/0053* (2013.01); *F16B 23/0092* (2013.01)

(58) Field of Classification Search
CPC . F16B 23/0092; F16B 23/003; F16B 23/0023
USPC ........................................... 411/410
See application file for complete search history.

(56) References Cited

U.S. PATENT DOCUMENTS

| | | | |
|---|---|---|---|
| 3,604,305 A * | 9/1971 | Dreger | F16B 23/003 411/403 |
| 5,020,954 A | 6/1991 | Dreger | |
| 5,358,368 A | 10/1994 | Conlan et al. | |
| 5,674,037 A * | 10/1997 | Lu | F16B 23/0092 411/404 |
| 6,293,745 B1 | 9/2001 | Lu | |
| 6,886,433 B2 * | 5/2005 | Totsu | B25B 15/005 81/436 |
| 9,962,759 B2 * | 5/2018 | Chen | F16B 23/003 |
| 10,428,859 B2 * | 10/2019 | Falkenstein | F16B 23/0023 |
| 2003/0059276 A1 | 3/2003 | Chen | |
| 2009/0257844 A1 * | 10/2009 | Chou | F16B 23/0023 411/410 |
| 2010/0129176 A1 * | 5/2010 | Karupaya | F16B 23/003 411/404 |
| 2018/0347611 A1 * | 12/2018 | Tsai | B21K 1/463 |
| 2018/0347612 A1 | 12/2018 | Falkenstein et al. | |

FOREIGN PATENT DOCUMENTS

| | | |
|---|---|---|
| EP | 2278175 A2 | 1/2011 |
| WO | 2015/027704 A1 | 5/2015 |

* cited by examiner

*Primary Examiner* — Flemming Saether
(74) *Attorney, Agent, or Firm* — Rosenberg, Klein & Lee (57) ABSTRACT

A screw includes a threaded shank and a head with a first surface. Communicating sockets formed in the first surface include a Pozi-type socket and a drive socket. The drive socket includes rounded portions, arched portions alternating with the rounded portions, and a conical portion connected to the rounded portions and the arched portions to define a first reference line and a second reference line parallel to a central axis of the head. The rounded portions are inclined outwardly from the first reference line, and the arched portions are inclined outwardly from the second reference line. Thus, a first room enclosed by the rounded portions and the arched portions increases gradually towards the first surface. By a combination of the above sockets, the head cooperates with different driving tools for delivering driving force efficiently and is more convenient to use.

11 Claims, 10 Drawing Sheets

SCREW HAVING A HEAD WITH DIFFERENT SOCKETS

BACKGROUND OF THE INVENTION

1. Field of the Invention

This invention relates to a screw and relates particularly to a screw having a head with different sockets.

2. Description of the Related Art

Figure 1:
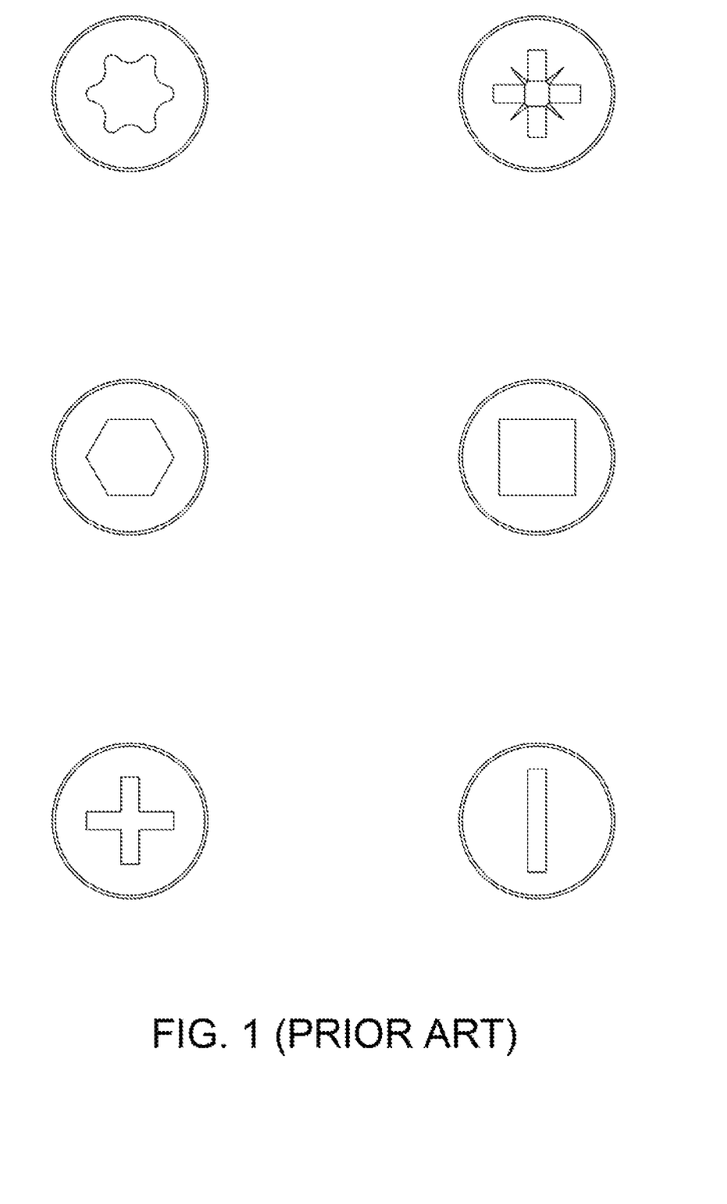
FIG. 1 is a schematic view showing conventional screw heads with common sockets.

FIG. 1 shows a screw head with different recesses, e.g. a slotted recess, a cross or a cruciform recess, a Pozi shaped recess having a cruciform recess with radial indentations set at forty-five degrees from the cruciform recess, a square recess, a hexagonal recess, and a Torx recess having a hexalobular arrangement. Electric or manual driving tools can be inserted into corresponding recesses for delivering driving force to a screw head of a screw. However, the screw is fastened to or loosened from a workpiece only when each driving tool fits each corresponding recess. In short, different driving tools cooperate with different recesses. This condition renders the screw unable to be fastened or loosened quickly and smoothly, and it takes more time to complete the above operations. Thus, the efficiency of fastening the screw to the workpiece is decreased. It is also inconvenient for a user to carry different driving tools and screws with different heads concurrently. Thus, improvements are needed.

SUMMARY OF THE INVENTION

An object of this invention is to provide a screw having a head with different sockets whereby the head is allowed to engage with different driving tools firmly and is more convenient to use.

The screw of this invention adapted to cooperate with different driving tools. The screw includes a head and a threaded shank. The head has a first surface and a second surface in opposing relationship to the first surface and defines a central axis passing through a center of the first surface. The threaded shank extends axially from the second surface. A Pozi-type socket is recessedly formed in the first surface and has four groove portions and four indentations. Each indentation is formed between every two adjacent groove portions. Each groove portion includes opposite side walls and an end wall connected to the side walls and sloping from the first surface inwardly towards the central axis. A drive socket is also formed in the first surface and communicates with the Pozi-type socket. The drive socket includes a plurality of rounded portions, a plurality of arched portions alternating with the rounded portions, and a conical portion connected to the rounded portions and the arched portions and tapering to an end of the head to form a conical point. The central axis passes through the conical point. A second room is enclosed by the conical portion. A first room is enclosed by the rounded portions and the arched portions. The first room is defined between the second room and the first surface. The first room and the second room communicate with each other. The conical portion and the rounded portions meet at a first reference point from which a first reference line is defined. The conical portion and the arched portions meet at a second reference point from which a second reference line is defined. Both references lines are parallel to the central axis. Each rounded portion is inclined outwardly from the first reference line by a first slope angle, and each arched portion is inclined outwardly from the second reference line by a second slope angle, thereby allowing the first room to increase gradually towards the first surface. By a combination of the Pozi-type socket and the drive socket, the head has a complex socket system whereby different driving tools are allowed to be inserted into the head to deliver efficient driving force to the head, execute a quick operation of fastening and loosening the screw without using much effort, and allow a user to operate with one hand. Thus, the head is more convenient to use.

Preferably, the first slope angle and the second slope angle range from 0.5 to 5 degrees, and the conical portion converges on the conical point to define a converging angle of not more than 120 degrees.

Preferably, in one preferred embodiment, the conical portion can include a first slanting wall extending from the conical point and a second slanting wall connected to the first slanting wall. A first included angle formed between the first slanting wall and the central axis is preferably set at 70 degrees. A second included angle formed between the second slanting wall and the central axis ranges from 40 to 60 degrees.

Preferably, in further preferred embodiments, a recessed socket can be formed among the first room and communicate with the Pozi-type socket and the drive socket. The recessed socket is enclosed by four or more than four equal extension sections to cooperate with a driving tool with multiple sides. A contact point is defined at an intersection of every two adjacent extension sections.

Preferably, in further preferred embodiments, the drive socket can have a four lobular contour or a hexalobular contour. The rounded portions of the drive socket can be set at an angle from the groove portions of the Pozi-type socket. The rounded portions and the groove portions can also be set in the same position. When a recessed socket is added, the contact points of the recessed socket can be set at an angle from the groove portions. The contact points, the groove portions, and the rounded portions can also be set in the same position.

Preferably, in further preferred embodiments, a slotted socket is added and communicates with the Pozi-type socket and the drive socket to cooperate with a flat-bladed driving tool. The slotted socket extends beyond a length between opposite groove portions of the Pozi-type socket.

BRIEF DESCRIPTION OF THE DRAWINGS

FIG. 13-1 is a top plan view showing a variation of FIG. 9;

FIG. 13-2 is a top plan view showing a variation of FIG. 10;

FIG. 13-3 is a top plan view showing a variation of FIG. 11; and

FIG. 13-4 is a top plan view showing a variation of FIG. 12.

DETAILED DESCRIPTION OF THE PREFERRED EMBODIMENTS

Figure 2:
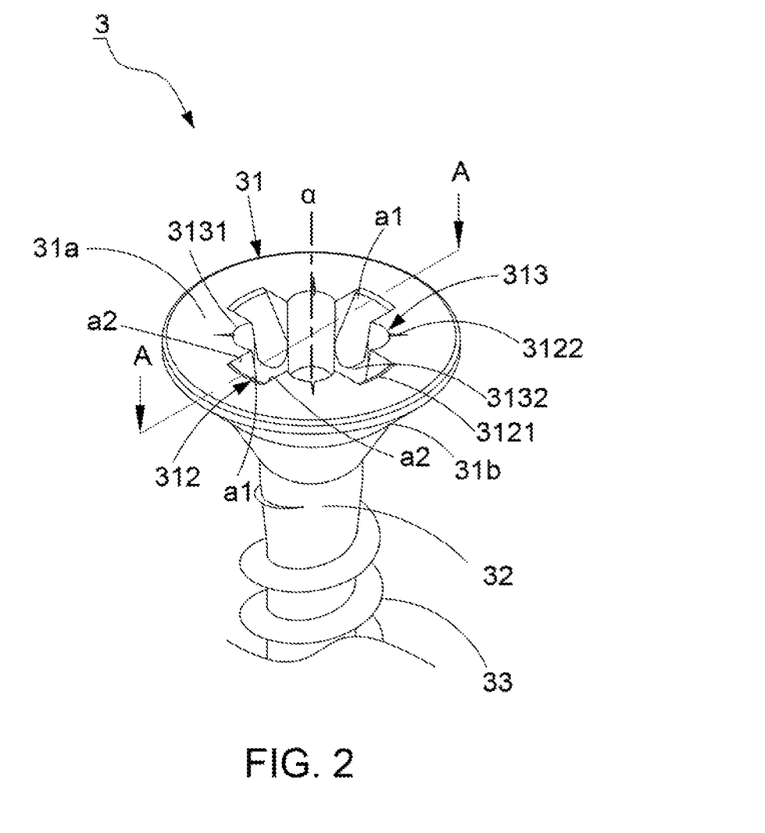
FIG. 2 is a schematic view showing a first preferred embodiment of this invention.
Figure 3:
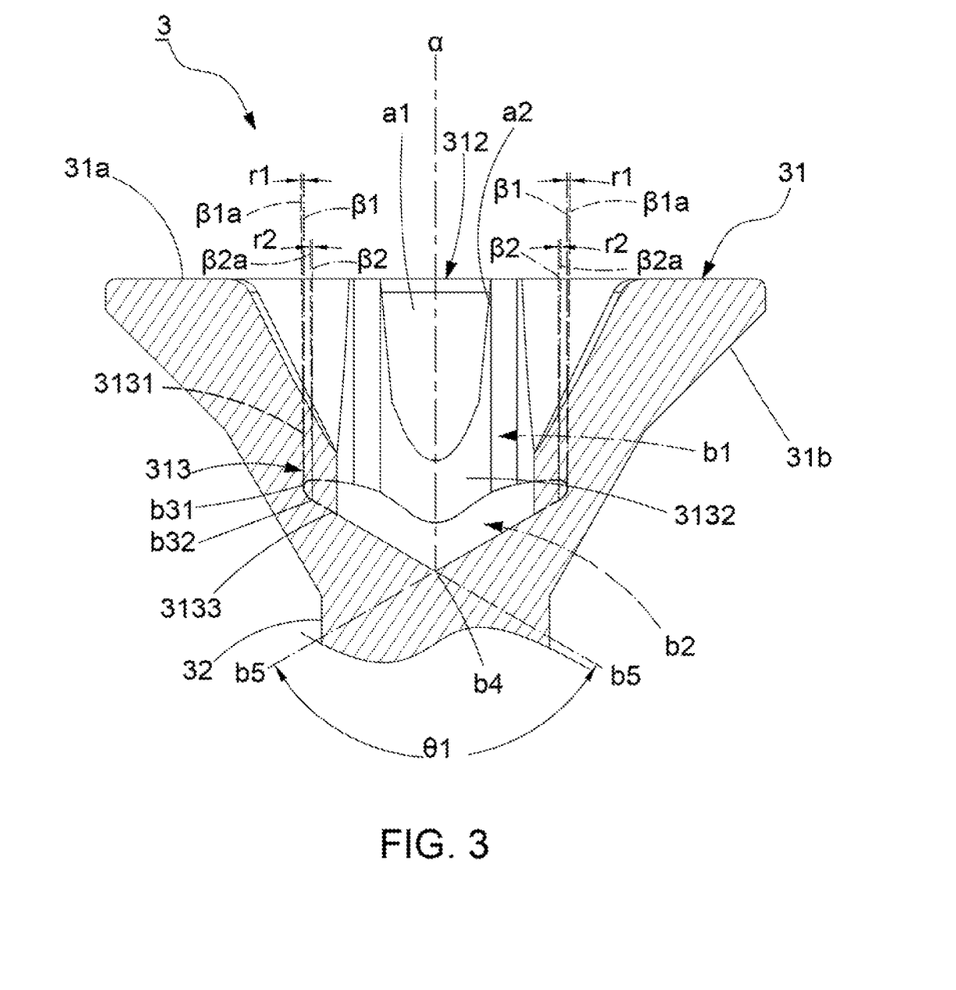
FIG. 3 is a cross-sectional view taken along the A-A line of FIG. 2.

Referring to FIG. 2 and FIG. 3, a first preferred embodiment of a screw 3 includes a head 31 and a threaded shank 32, The threaded shank 32 is a shank on which a threaded portion 33 is spirally disposed. The head 31 has a first surface 31a and a second surface 31b. The first surface 31a and the second surface 31b are in opposing relationship, and the shank 32 extends axially from the second surface 31b. The head 31 defines a central axis α passing through a center of the first surface 31a. The head. 31 has a Pozi-type socket 312 and a drive socket 313. Both sockets 312, 313 are recessedly formed in the first surface 31a and communicate with each other. The word "Pozi" stated herein is a term for a cruciform recess with radial indentations set at an angle such as forty-five degrees from the cruciform recess. Accordingly, the Pozi-type socket 312 has four groove portions 3121 and four indentations 3122. Each indentation 3122 is formed between every two adjacent groove portions 3121. The size of the indentation 3122 is smaller than the size of the groove portion 3121. Each groove portion 3121 includes opposite side walls a2 and an end wall a1 connected to both side walls a2. The end wall a1 slopes from the first surface 31a inwardly towards the central axis α. In other words, the end wall a1 slopes from the first surface 31a towards the second surface 31b at a slope inwardly towards the central axis α.

The drive socket 313 is formed between the Pozi-type socket 312 and includes a plurality of rounded portions 3131, a plurality of arched portions 3132, and a conical portion 3133. Two adjacent rounded portions 3131 are separated by one arched portion 3132, so the arched portions 3132 alternate with the rounded portions 3131. In other words, the arched portion 3132 extends from one rounded portion 3131 to another adjacent rounded portion 3131. The conical portion 3133 is connected to the rounded portions 3131 and the arched portions 3132. The conical portion 3133 tapers to an end of the head 31 to form a conical point b4, and the central axis α passes through the conical point b4. The drive socket 313 forms communicating rooms. For example, a second room b2 is enclosed by the conical portion 3133. A first room b1 is enclosed by the rounded portions 3131 and the arched portions 3132. The first room b1 is enclosed when the rounded portions 3131 and the arched portions 3132 extend in alternation, so the first room b1 is defined between the second room b2 and the first surface 31a and communicates with the second room b2. The conical portion 3133 and the rounded portions 3131 meet at a first reference point b31 from which a first reference line β1 is defined. The conical portion 3133 and the arched portions 3132 meet at a second reference point b32 from which a second reference line β2 is defined. Both reference lines β1, β2 are parallel to the central axis α. Each rounded portion 3133 is inclined outwardly from the first reference line β1 by a first slope angle r1. Specifically, the rounded portion 3133 extends inclinedly from the first reference point b31 to the first surface 31a in an outward direction to define a first inclination line β1a. The first slope angle r1 is defined between the first reference line β1 and the first inclination line β1a. Each arched portion 3132 is inclined outwardly from the second reference line β2 by a second slope angle r2. The arched portion 3132 extends inclinedly from the second reference point b32 in an outward direction to define a second inclination line β2a. The second slope angle r2 is defined between the second reference line β2 and the second inclination line β2a. The slope angles r1, r2 are set from 0.5 to 5 degrees, preferably set at 0.5 degrees, so the first room b1 increases gradually towards the first surface 31a.

The conical portion 3133 converges on the conical point b4 from which two imaginary lines b5 are defined. A converging angle θ1 of not more than 120 degrees is formed between the imaginary lines b5. Specifically, the converging angle θ1 is 120 degrees or less than 120 degrees.

In the first preferred embodiment, four rounded portion 3131 are formed, so the drive socket 313 becomes a four lobular arrangement. Each rounded portion 3131 is situated between every two adjacent groove portions 3121, so the rounded portions 3131 of the drive socket 313 are set at an angle from the groove portions 3121 of the Pozi-type socket 312, and each arched portion 3132 formed between the adjacent rounded portions 3131 is connected to the side walls a2 and the end wall a1 of the adjacent groove portion 3121. Therefore, a Pozi-type driving tool, a cruciform-type driving tool, a four-lobular driving tool, and other similar driving tools can be inserted into the head 31.

Referring to FIGS. 2 and 3, a combination of the Pozi-type socket 312 and the drive socket 313 allows the head 31 to cooperate with various driving tools (not shown). For example, when a Pozi-type driving tool or a driving tool having a cruciform or cross shape is used, the slope of each end wall a1 allows an insertion portion of the driving tool to enter the Pozi-type socket 312 easily and engage with the groove portions 3121. Because the converging angle θ1 does not exceed 120 degrees, the driving tool having a standard size or a nonstandard size goes deep into the Pozi-type socket 312, and it is possible that a tip of the driving tool touches the conical point b4. Thus, the problem that the driving tool fails to insert into the head 31 is not caused, and a firm engagement between the head 31 and the driving tool is attained. When a driving tool with four lobes is used, the slope angles r1, r2 caused by the outward inclinations of the rounded portions 3131 and the arched portions 3132 allow the driving tool to go deep into the drive socket 313. It is possible that a partial wall surface or a whole wall surface of the four-lobular driving tool comes into contact with the rounded portions 3132 and the arched portions 3132 to attain a firm engagement and deliver driving force to the head 31 efficiently. Accordingly, when any of the aforementioned driving tools adds pressure to the head 31, the driving tool engages with the end wall a1 and side walls a2 of the groove portion 3121 or engages with the rounded portion 3131 and the arched portion 3132 of the drive socket 313 in order to prevent the driving tool from escaping from the head 31 and prevent the swaying movement of the driving tool. Therefore, the driving tool delivers full driving force to the head 31 and rotates the screw 3 to execute a fastening operation without using much effort. The slope of the groove portions 3121 and the inclination of the arched portions 3131 and arched portions 3132 also allow the driving tool to loosen the screw 3 smoothly and conveniently. In short, the head 31 is adapted to engage with two or more kinds of driving tools firmly, and a user is allowed to operate with one hand. The convenience of using the screw 3 increases.

Figure 4:
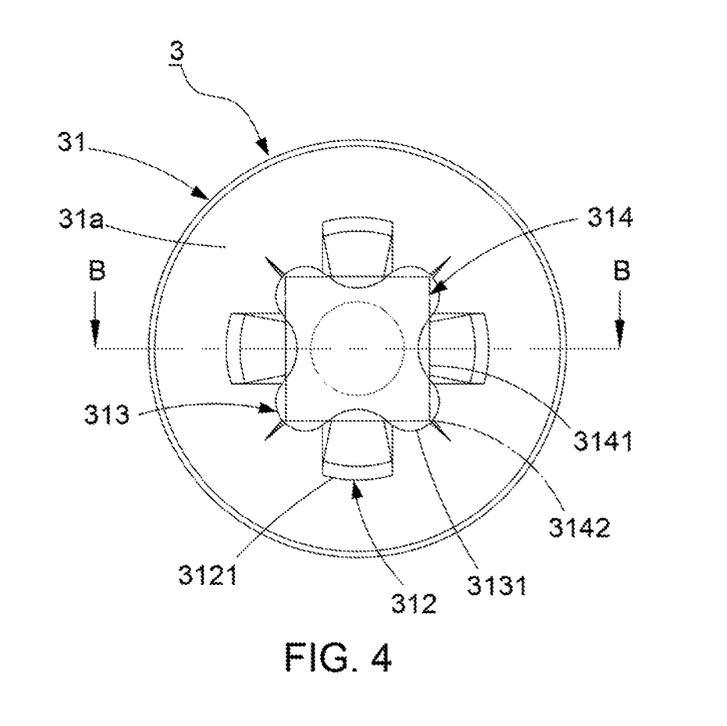
FIG. 4 is a top plan view showing a second preferred embodiment of this invention.
Figure 5:
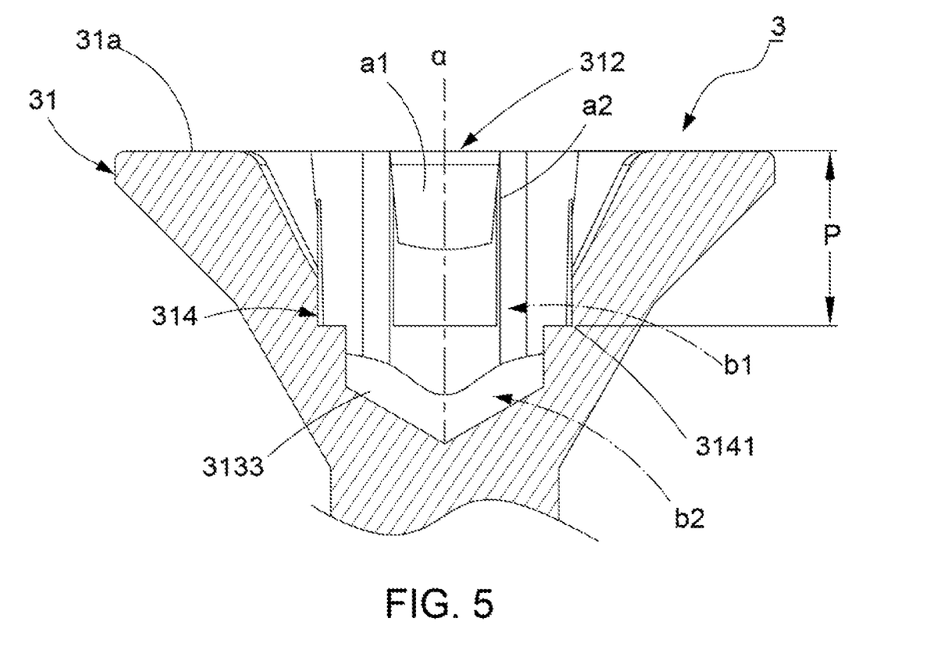
FIG. 5 is a cross-sectional view taken along the B-B line of FIG. 4.
Figure 6:
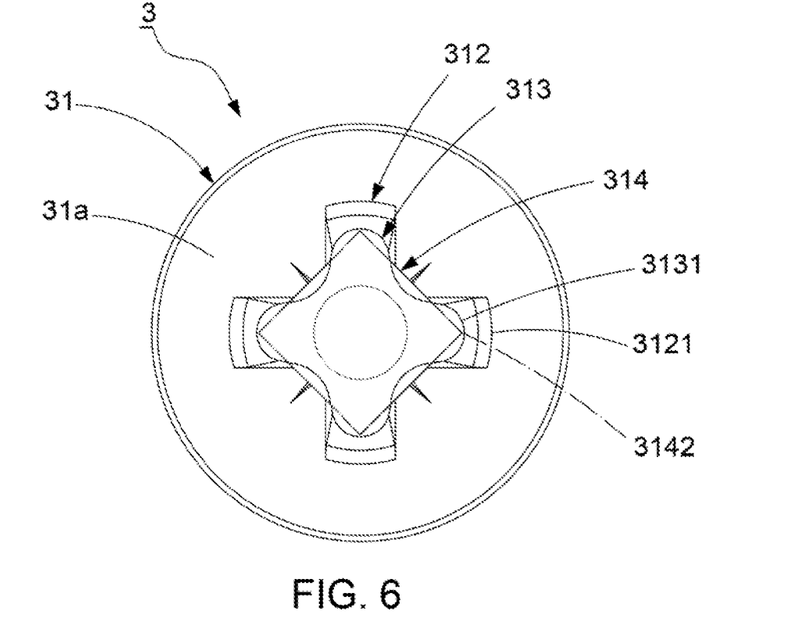
FIG. 6 is a top plan view showing a third preferred embodiment of this invention.

Referring to FIGS. 4 and 5, a second preferred embodiment of this invention has the same elements and effects as those of the first preferred embodiment. The second preferred embodiment is characterised in that a recessed socket 314 is recessedly formed in the first surface 31a and communicates with the Pozi-type socket 312 and the drive socket 313. The recessed socket 314 is enclosed by at least four extension sections 3141 which are equal in length. As shown in the figures, the recessed socket 314 is preferably defined as a square recess. At least four contact points 3142 are defined, each of which is defined at an intersection of every two adjacent extension sections 3141. Accordingly, the recessed socket 314 is recessedly formed between the first surface 31a and the conical portion 3133. In other words, the recessed socket 314 is formed among the first room b1, namely above the second room b2, and a distance P is defined between each extension section 3141 and the first surface 31a. In this preferred embodiment, the extension section 3141 can have no slope. Furthermore, at least one contact point 3142 can be defined at a location corresponding to at least one rounded portion 3131 of the drive socket 313 and is situated between every two adjacent groove portions 3121 of the Pozi-type socket 312. Thus, the contact points 3142 can be set at an angle from the groove portions 3121. Alternatively, at least one contact point 3142 can be defined at a location corresponding to at least one rounded portion 3131 and at least one groove portion 3121, so the contact point 3142 of the recessed socket 314, the groove portion 3121 of the Pozi-type socket 312, and the rounded portion 3131 of the drive socket 313 are all set in the same position, as a third preferred embodiment shown in FIG. 6. When the recessed socket 314 is added, the head 31 can cooperate with a Pozi-type driving tool, a cruciform-type driving tool, a four-lobular driving tool, a square driving tool, and other similar driving tools and can engage with different driving tools firmly for delivering driving force quickly and conveniently.

Figure 7:
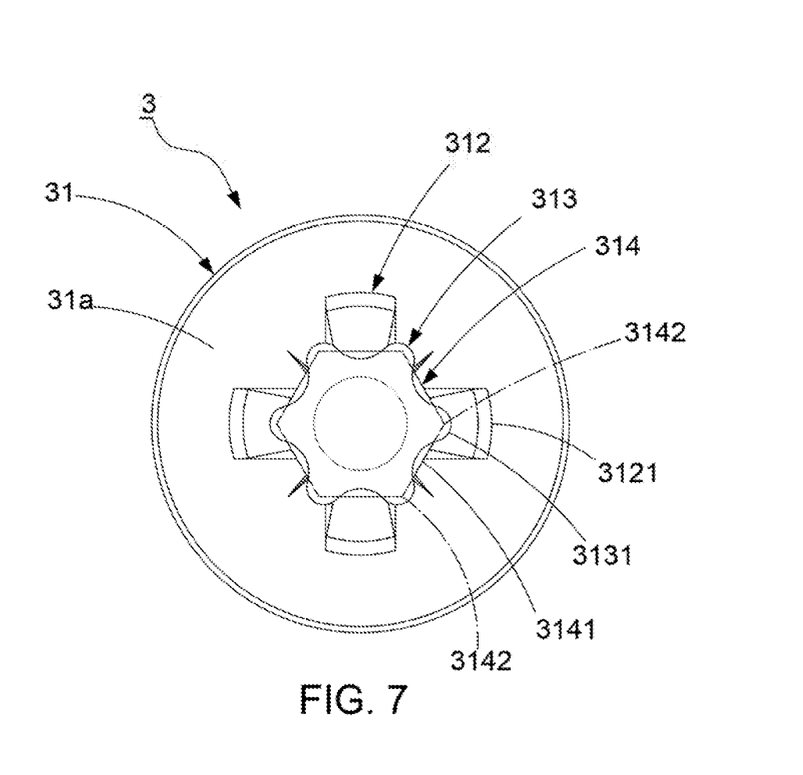
FIG. 7 is a top plan view showing a fourth preferred embodiment of this invention.

Referring to FIG. 7, a fourth preferred embodiment of this invention differs from the second preferred embodiment in that the drive socket 313 includes six rounded portions 3131 to present a hexalobular arrangement. The recessed socket 314 is enclosed by six extension sections 3141 equal in length and six contact points 3142, so the recessed socket 314 is defined as a hexagonal recess in this preferred embodiment. Each contact point 3142 is defined at an intersection of every two adjacent extension sections 3141. Furthermore, at least one contact point 3142 is situated at a location corresponding to at least one rounded portion 3131. Some contact points 3142 each are situated between the adjacent groove portions 3121, and the other contact points 3142 each are situated at a location corresponding to each groove portion 3121. Therefore, the head 31 can cooperate with a Pozi-type driving tool, a cruciform-type driving tool, a hexalobular driving tool, a hexagonal driving tool, and other similar driving tools for attaining the firm engagement and the convenient use, as aforementioned.

Figure 8:
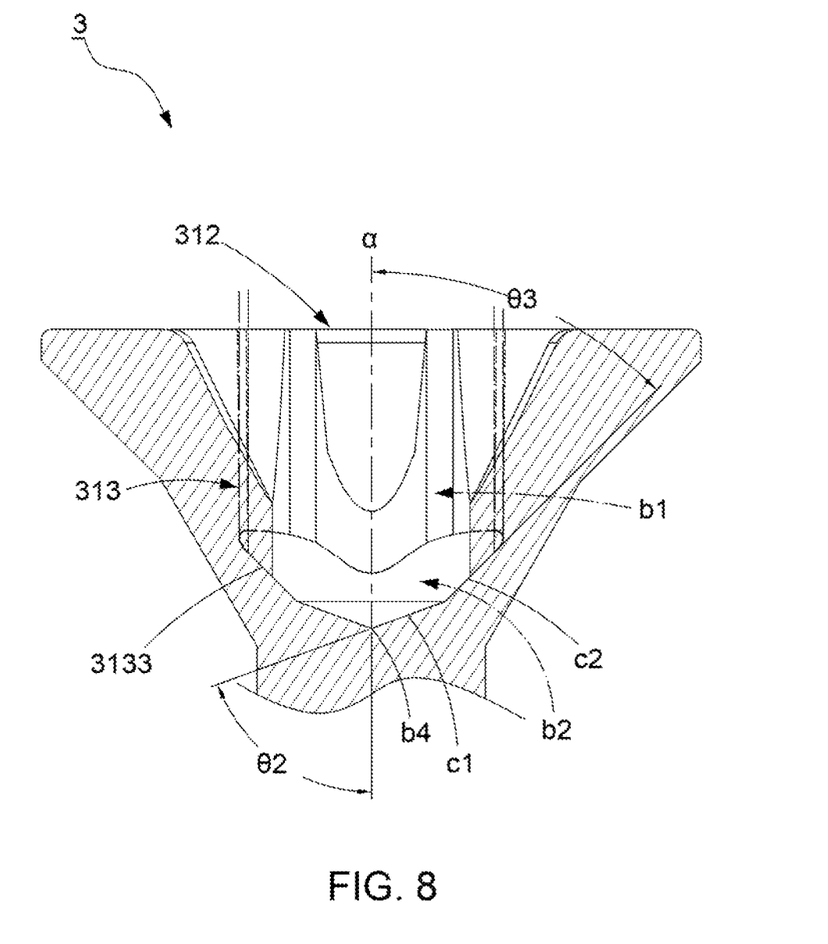
FIG. 8 is a cross-sectional view showing a fifth preferred embodiment of this invention.

Referring to FIG. 8, a fifth preferred embodiment of this invention has the same elements and effects as those of the first preferred embodiment. The fifth preferred embodiment is characterised in that the conical portion 3133 has more than one slanting wall whereby a driving tool with a small conical tip or a nonstandard conical tip can be easily inserted into the head 31. Specifically, the conical portion includes a first slanting wall c1 extending from the conical point b4 and a second slanting wall c2 connected to the first slanting wall c1. Preferably, the second slanting wall c2 extends from the first slanting wall c1 to the first room b1 of the drive slot 313. A first included angle θ2 is formed between the first slanting wall c1 and the central axis α and ranges from 60 to 70 degrees. A second included angle θ3 is formed between the second slanting wall c2 and the central axis α and ranges from 40 to 60 degrees. The first included angle θ2 can be larger than the second included angle θ3 and can be preferably set at 70 degrees. The slanting walls c1, c2 can also be applied to the aforementioned preferred embodiments. Therefore, if a tip of a driving tool with multiple lobes is smaller or has a nonstandard dimension, the tip goes deep into the conical portion 3133 because of the second included angle θ3 and adds pressure to the second slanting wall c2. The second slanting wall c2 may deform slightly because of the pressure, and thus the driving tool is allowed to engage with the conical portion 3133 and the drive socket 313 firmly. Accordingly, the driving force of the driving tool is efficiently delivered to the head 31, and the fastening operation of the screw 3 is executed without using much effort and is operated with one hand of the user. Thus, the screw 3 is convenient to use. The situation that driving tools with specific dimensions fail to go deep into the end of the head 31 can also be prevented.

Figure 9:
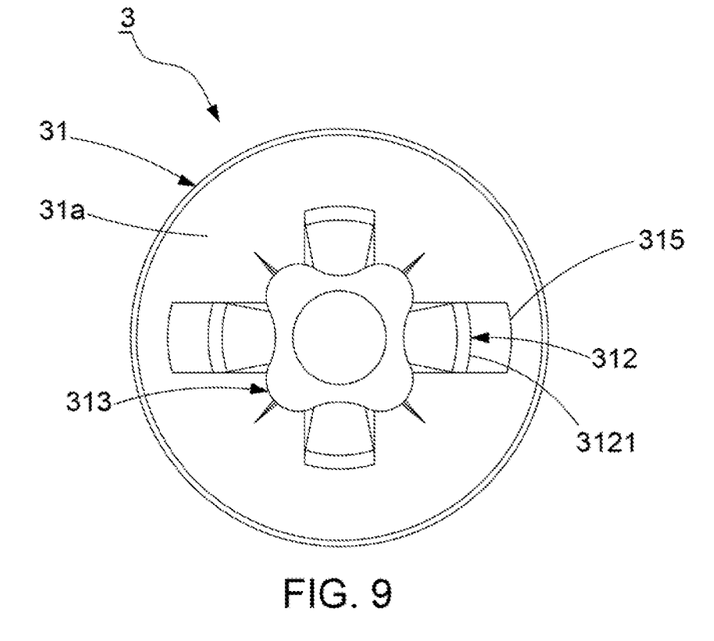
FIG. 9 is a top plan view showing a sixth preferred embodiment of this invention.
Figure 10:
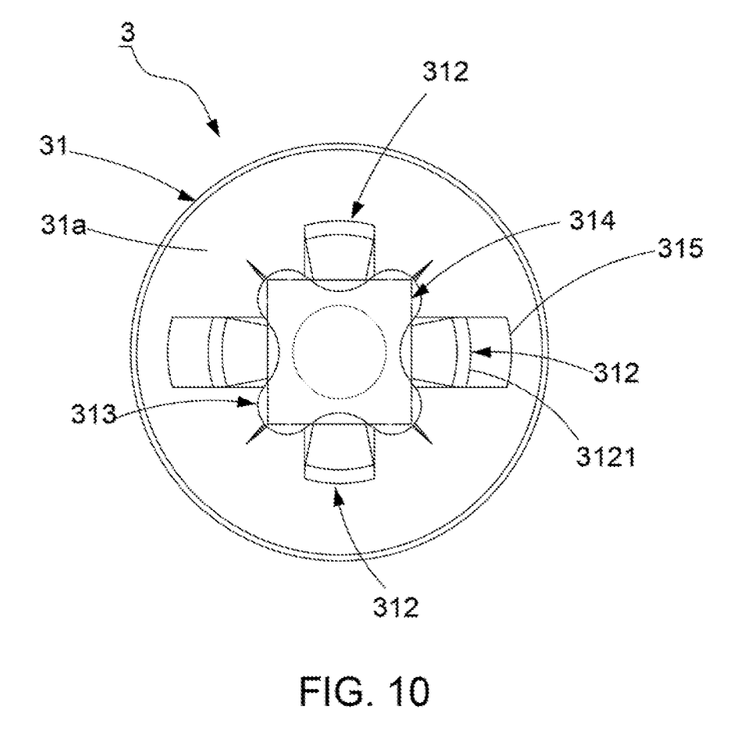
FIG. 10 is a top plan view showing a seventh preferred embodiment of this invention.
Figure 11:
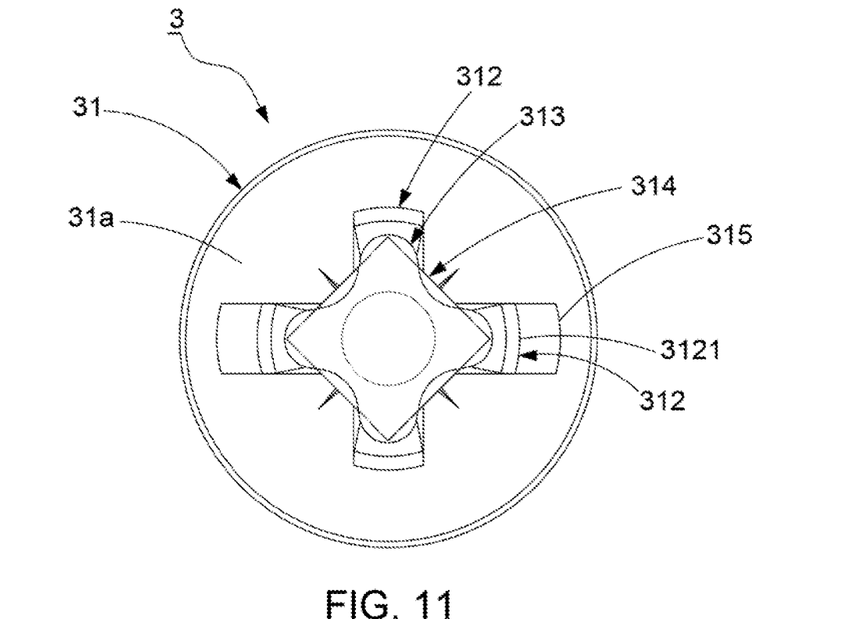
FIG. 11 is a top plan view showing an eighth preferred embodiment of this invention.
Figure 12:
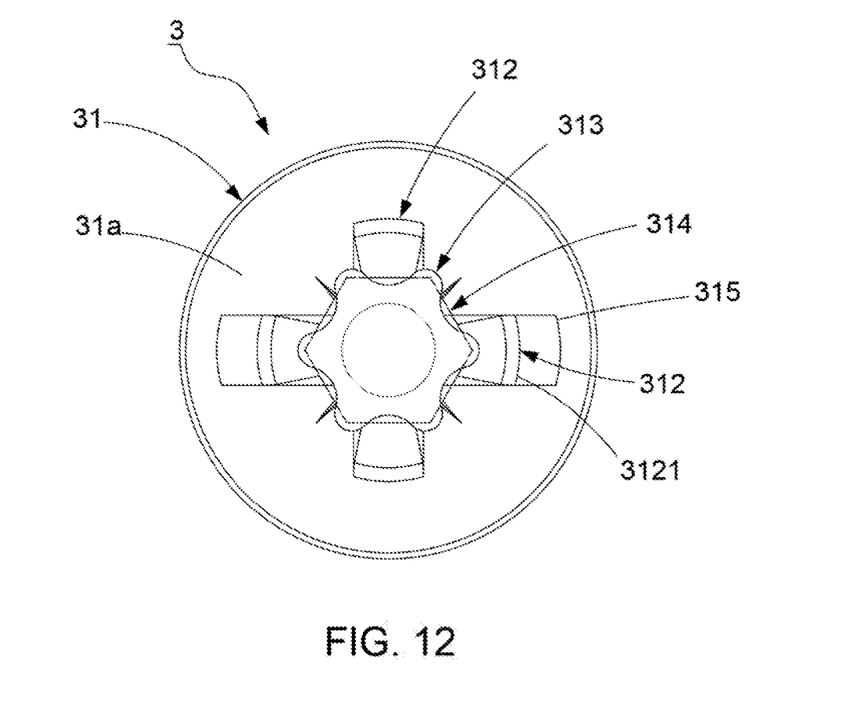
FIG. 12 is a top plan view showing a ninth preferred embodiment of this invention.
Figure 131:
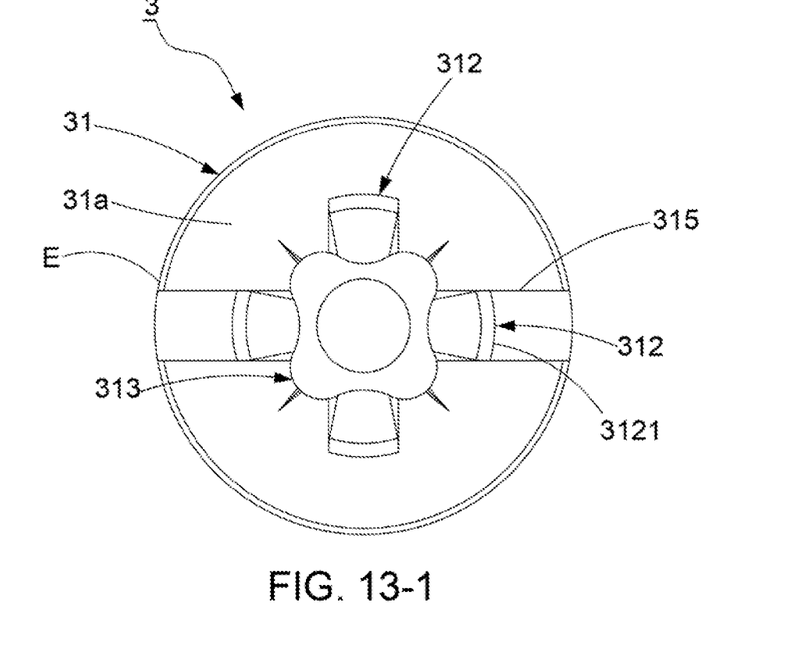
Figure 132:
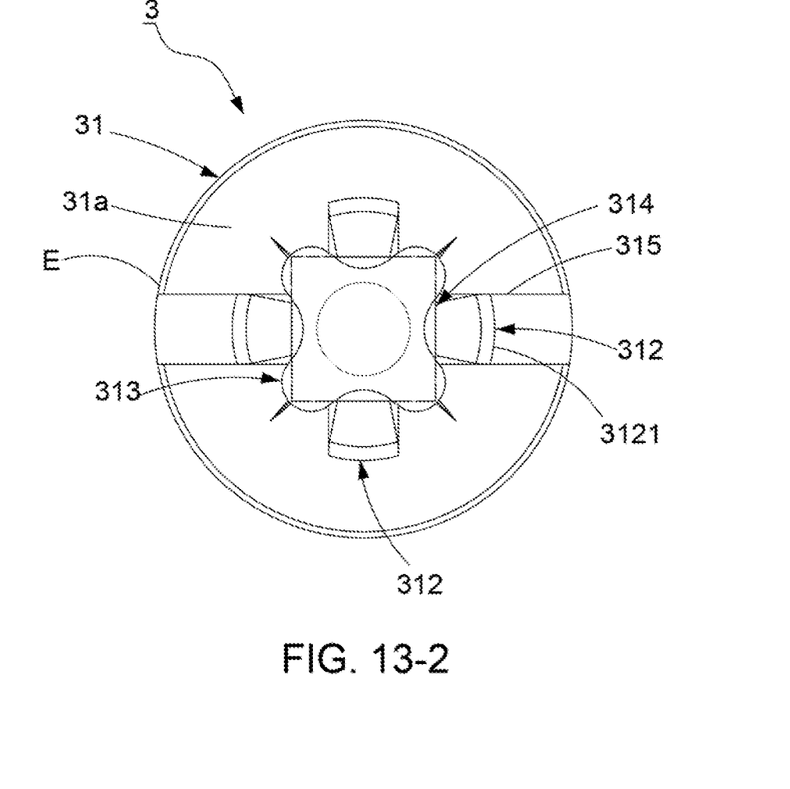
Figure 133:
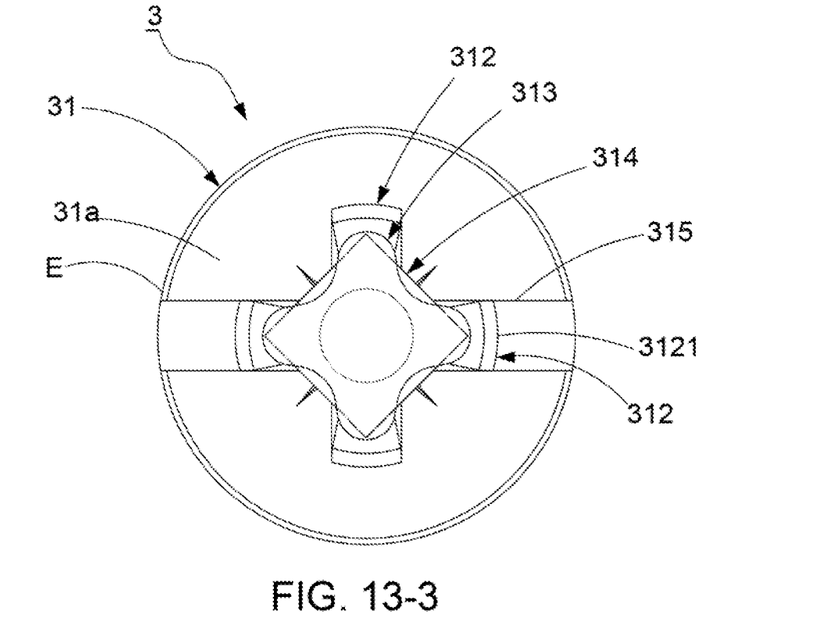
Figure 134:
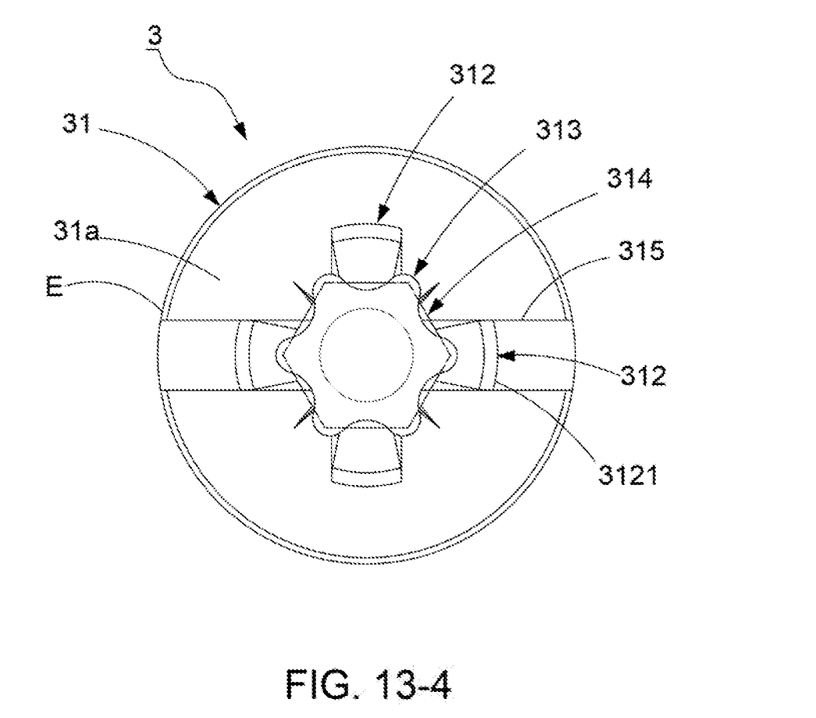

Referring to FIG. 9, a sixth preferred embodiment of this invention has the same elements and effects as those of the first preferred embodiment. The sixth preferred embodiment is characterised in that a slotted socket 315 is formed in the first surface 31a and communicates with Pozi-type socket 312 and the drive socket 313. The slotted socket 315 is longer than the Pozi-type socket 312. In other words, the length of the slotted socket 315 is larger than the length defined from one groove portion 3121 to another groove portion 3121 opposite the groove portion 3121. Thus, the slotted socket 315 is superimposed on two opposite groove portions 3121 of the Pozi-type socket 312 and extends beyond the Pozi-type socket 312. It is also possible that the slotted socket 315 is applied to other preferred embodiments as previously described. For example, FIG. 10 shows the slotted socket 315 is added to the second preferred embodiment. FIG. 11 shows the slotted socket 315 is added to the third preferred embodiment. FIG. 12 shows the slotted socket 315 is added to the fourth preferred embodiment. It is also possible to adjust the length of the slotted socket 315, as shown in FIGS. 13-1 to 13-4 where two ends of the slotted socket 315 reach a peripheral edge E of the first surface 31a. Accordingly, the head 31 shown in FIGS. 9 and 13-1 can cooperate with a Pozi-type driving tool, a cruciform-type driving tool, a four lobular driving tool, and a driving tool with a flat blade. The head 31 shown in FIGS. 10, 11, 13-2, and 13-3 can cooperate with a Pozi-type driving tool, a cruciform-type driving tool, a four lobular driving tool, a flat-bladed driving tool, and a square driving tool. The head 31 shown in FIGS. 12 and 13-4 can cooperate with a Pozi-type driving tool, a cruciform-type driving tool, a hexalobular driving tool, a flat-bladed driving tool, and a hexagonal driving tool. Thus, a firm engagement between the head 31 and different kinds of driving tools is attained, and the head 31 is more convenient to use.

To sum up, the screw of this invention takes advantage of a head with different sockets to cooperate with different driving tools. Because different driving tools are allowed to be firmly engaged with the head, the screw subjected to an efficient driving force of the driving tools can be quickly fastened to or loosened from a workpiece without using much effort. A user can also use one hand to operate the screw. Thus, the convenience of using the head is increased.

While the embodiments are shown and described above, it is understood that further variations and modifications may be made without departing from the scope of this invention.

What is claimed is:

1. A screw comprising a head including a first surface and a second surface in opposing relationship to said first surface, said screw further comprising a threaded shank extending axially from said second surface, said head defining a central axis passing through a center of said first surface, a Pozi-type socket being recessedly formed in said first surface and having four groove portions and four indentations each formed between every two adjacent groove portions, each of said groove portions including opposite side walls and an end wall connected to said side walls, said end wall sloping from said first surface inwardly towards said central axis;
   wherein a drive socket is formed in said first surface and communicates with said Pozi-type socket, said drive socket including a plurality of rounded portions, a plurality of arched portions alternating with said plurality of rounded portions, and a conical portion connected to said plurality of rounded portions and said plurality of arched portions and tapering to an end of said head to form a conical point, each of said plurality of arched portions is directly connected with a corresponding end wall, and a second interface between each of said plurality of arched portions and the respective end wall is an arcuate structure extending in a direction parallel to the central axis, each of said plurality of arched portions also being directly connected to a corresponding one of said rounded portions, wherein said conical portion converges on said conical point to form a converging angle of not more than 120 degrees, said central axis passing through said conical point, a second room being enclosed by said conical portion, a first room being enclosed by said plurality of rounded portions and said plurality of arched portions and defined between said second room and said first surface, said first room communicating with said second room, said conical portion and said plurality of rounded portions meeting at a first reference point from which a first reference line is defined, said conical portion and said plurality of arched portions meeting at a second reference point from which a second reference line is defined, said first reference line and said second reference line being parallel to said central axis, each of said plurality of rounded portions being inclined outwardly from said first reference line by a first slope angle, each of said plurality of arched portions being inclined outwardly from said second reference line by a second slope angle, and said first room thereby increasing gradually towards said first surface, wherein said first slope angle and said second slope angle range from 0.5 to 5 degrees.

2. The screw according to claim 1, wherein said drive socket includes four rounded portions.

3. The screw according to claim 2, wherein a recessed socket is formed in said first surface and communicates with said Pozi-type socket and said drive socket, said recessed socket being enclosed by at least four equal extension sections and at least four contact points each defined at an intersection of every two adjacent extension sections, said recessed socket being recessedly formed among said first room between said first surface and said conical portion to define a distance between each of said extension sections and said first surface.

4. The screw according to claim 3, wherein at least one of said contact points is defined at a location corresponding to at least one of said rounded portions and is situated between two adjacent groove portions.

5. The screw according to claim 3, wherein at least one of said contact points is defined at a location corresponding to at least one of said rounded portions and at least one of said groove portions.

6. The screw according to claim 3, wherein a slotted socket is formed in said first surface and communicates with said Pozi-type socket, said drive socket, and said recessed socket, said slotted socket extending beyond a length from one of said groove portions to another one of said groove portions opposite said one groove portion.

7. The screw according to claim 1, wherein said conical portion includes a first slanting wall extending from said conical point and a second slanting wall connected to said first slanting wall, a first included angle being formed between said first slanting wall and said central axis, a second included angle being formed between said second slanting wall and said central axis.

8. The screw according to claim 1, wherein a slotted socket is formed in said first surface and communicates with said Pozi-type socket and said drive socket, said slotted socket extending beyond a length from one of said groove portions to another one of said groove portions opposite said one groove portion.

9. A screw comprising a head including a first surface and a second surface in opposing relationship to said first surface, said screw further comprising a threaded shank extending axially from said second surface, said head defining a central axis passing through a center of said first surface, a Pozi-type socket being recessedly formed in said first surface and having four groove portions and four indentations each formed between every two adjacent groove portions, each of said groove portions including opposite side walls and an end wall connected to said side walls, said end wall sloping from said first surface inwardly towards said central axis;
   wherein a drive socket is formed in said first surface and communicates with said Pozi-type socket, said drive socket including a plurality of rounded portions, a plurality of arched portions alternating with said plurality of rounded portions, and a conical portion connected to said plurality of rounded portions and said plurality of arched portions and tapering to an end of said head to form a conical point, each of said rounded portions being situated between every two adjacent groove portions, said central axis passing through said conical point, a second room being enclosed by said conical portion, a first room being enclosed by said plurality of rounded portions and said plurality of arched portions and defined between said second room and said first surface, said first room communicating with said second room, said conical portion and said plurality of rounded portions meeting at a first reference point from which a first reference line is defined, said conical portion and said plurality of arched portions meeting at a second reference point from which a second reference line is defined, said first reference line and said second reference line being parallel to said central axis, each of said plurality of rounded portions being inclined outwardly from said first reference line by a first slope angle, each of said plurality of arched portions being inclined outwardly from said second reference line by a second slope angle, and said first room thereby increasing gradually towards said first surface.

10. A screw comprising a head including a first surface and a second surface in opposing relationship to said first surface, said screw further comprising a threaded shank extending axially from said second surface, said head defining a central axis passing through a center of said first surface, a Pozi-type socket being recessedly formed in said first surface and having four groove portions and four indentations each formed between every two adjacent groove portions, each of said groove portions including opposite side walls and an end wall connected to said side walls, said end wall sloping from said first surface inwardly towards said central axis, wherein a first interface between said end wall and said first surface is an arcuate structure;

wherein a drive socket is formed in said first surface and communicates with said Pozi-type socket, said drive socket including a plurality of rounded portions, a plurality of arched portions alternating with said plurality of rounded portions, and a conical portion connected to said plurality of rounded portions and said plurality of arched portions, wherein each of said plurality of arched portions is directly connected with a corresponding end wall, and a second interface between each of said plurality of arched portions and the respective end wall is an arcuate structure extending in a direction parallel to the central axis, wherein each of said plurality of arched portions is also directly connected to a corresponding one of said rounded portions, said conical portion tapering to an end of said head to form a conical point, said central axis passing through said conical point, a second room being enclosed by said conical portion, a first room being enclosed by said plurality of rounded portions and said plurality of arched portions and defined between said second room and said first surface, said first room communicating with said second room, said conical portion and said plurality of rounded portions meeting at a first reference point from which a first reference line is defined, said conical portion and said plurality of arched portions meeting at a second reference point from which a second reference line is defined, said first reference line and said second reference line being parallel to said central axis, each of said plurality of rounded portions being inclined outwardly from said first reference line by a first slope angle, each of said plurality of arched portions being inclined outwardly from said second reference line by a second slope angle, and said first room thereby increasing gradually towards said first surface.

11. The screw according to claim 10, wherein said conical portion includes a first slanting wall extending from said conical point and a second slanting wall connected to said first slanting wall, a first included angle being formed between said first slanting wall and said central axis, a second included angle being formed between said second slanting wall and said central axis, said first included angle ranging from 60 to 70 degrees, said second included angle ranging from 40 to 60 degrees.

* * * * *